United States Patent [19]

Belbel et al.

[11] Patent Number: 4,733,031

[45] Date of Patent: Mar. 22, 1988

[54] SWITCHING APPARATUS PROTECTED AGAINST SHORT CIRCUIT CURRENTS

[76] Inventors: Elie Belbel, 11, rue des Econdeaux, 93800 Epinay Sur Seine; Christian Blanchard, 4, rue de Tilana, 92000 Nanterre; André Haury, 75, Avenue, Thiers, 93340 Le Raincy; Michel Lauraire, 43, Avenue du Capitaine Guynemer, 92400 Courbevoie, all of France

[21] Appl. No.: 860,372

[22] Filed: May 6, 1986

[30] Foreign Application Priority Data

May 6, 1985 [FR] France ................................. 85 07163

[51] Int. Cl.[4] ...................... H01H 9/30; H01H 33/00
[52] U.S. Cl. .................................. 200/144 A; 361/13; 200/151
[58] Field of Search ........... 361/13; 200/151, 144 AA

[56] References Cited

U.S. PATENT DOCUMENTS 4,550,356 10/1985 Takahashi ............................. 361/13
4,562,323 12/1985 Belbel .................................. 200/151

Primary Examiner—E. A. Goldberg
Assistant Examiner—Lincoln Donovan
Attorney, Agent, or Firm—William A. Drucker

[57] ABSTRACT

A contactor apparatus is provided protected against short circuit currents, comprising for each phase between input and output terminals a contactor switch and a protective switch with automatic opening, a transfer electrode being placed close to the contacts of this second switch for shunting into a parallel circuit a considerable fraction of the fault currents.

13 Claims, 17 Drawing Figures

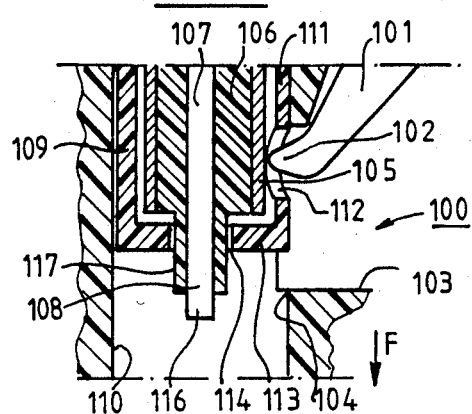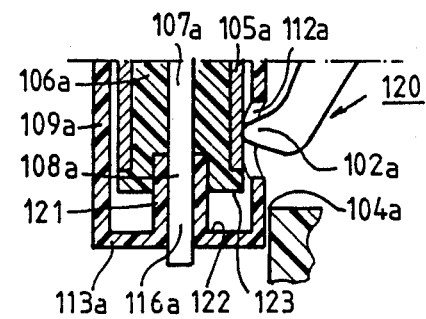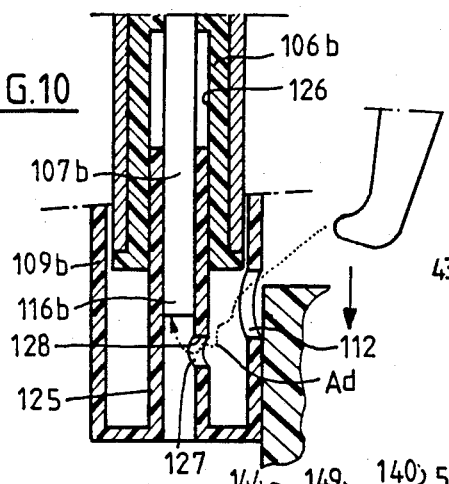

SWITCHING APPARATUS PROTECTED AGAINST SHORT CIRCUIT CURRENTS

BACKGROUND OF THE INVENTION

1. Field of the Invention

The invention relates to a protective switching apparatus or system comprising between the two connection terminals connected respectively to the electric mains and to a load, on the one hand, a first switch which is controlled by an electromagnet and which is adapted to establish and interrupt frequently the nominal current of the load, and on the other hand a second switch with automatic opening having properties for limiting fault currents such as those of short circuits, so as to ensure protection of the lines and prevent damage to the first switch.

2. Description of the Prior Art

In known systems or apparatus, which correspond to the general construction mentioned above, different types of limiting switches are met with having special properties, for which they are preferably chosen depending on the nature of the lines, of the load, of the ability of the first switch to withstand overload, and, also, on the probable frequency of the appearance of faults.

These limiting switches may be fuses, mechanical switches with high speed opening comparable to those of circuit breakers, switches with automatic opening which use repulsion forces, or switches with an isolating screen in which this latter provides rapid shearing of the arc.

If no other precautions are taken other than those consisting in placing the two switches in series, force compensation devices must be associated with the first switch for avoiding lifting of the mobile contact under the effect of repulsion forces which develop locally; these devices generally comprise magnetizable pieces whose behavior in the presence of large currents counterbalances the electrodynamic repulsion forces which cause such lifting.

These devices and precautions however do not prevent the first switch from having very high currents flowing therethrough and which consequently its geometry must take into account. It has also been proposed to provide the mobile contacts of the first switch with very powerful pressure springs for avoiding the above mentioned lifting, but this measure requires the use of an electromagnet which is so powerful that the contactor apparatus must then be totally reconstructed.

Finally, it has been proposed to downgrade the contactor apparatus used in the above mentioned circumstances, that is to say to use a first switch belonging to an apparatus suitable for a much higher nominal current; such a solution is obviously costly, and results further in a material over load of the installations.

The invention proposes consequently providing a combined apparatus such as the one whose general construction is defined above with robust means adapted for transferring a considerable fraction of the overload current into a parallel channel.

SUMMARY OF THE INVENTION

According to the invention, the desired aim is attained because, in the vicinity of the contacts of the second switch, there is disposed a transfer electrode isolated therefrom, which is connected to the potential of a connection terminal of the first switch by a conductor placed in parallel across this latter, and which is adapted to form, with the contact of this second switch connected to the other connection terminal and at the time of its opening, a transfer path ionized by the initial arc appearing at the time of opening.

In an advantageous embodiment of the invention, which provides rapid formation of the transfer path and avoids untimely restriking of the initial arc, an isolating screen comes between the contacts of the second switch for moving the medium ionized by the initial arc towards the transfer electrode; in a second embodiment which is derived from the preceding one, and which is more particularly adapted for protecting the first switch, the initial arc is completely destabilized by a strangling or shearing effect which the screen performs thereon; in a third embodiment which is more particularly adapted for providing protection of the lines, respectively of the load, the same screen provides complete destabilization of the transfer arc; finally, in a last embodiment for improving the results obtained above, the energy of the initial arc is used for obtaining very rapid propulsion of the isolating screen.

BRIEF DESCRIPTION OF THE DRAWINGS

The invention, as well as different embodiments to which it lends itself, will be better understood from reading the following description with reference to the accompanying Figures in which:

FIGS. 8, 9 and 10 show local sections of different embodiments of the transfer electrode and of the tubular screen which is associated therewith;

FIG. 11 illustrates in a simplified view members associated in a complementary way with an apparatus such as the one described in the preceding Figures;

FIG. 12 shows a top view of an apparatus such as the one shown in FIG. 5, in which more particularly arrangements have been made such as those shown in FIG. 11;

DESCRIPTION OF THE PREFERRED EMBODIMENT

Figure 1:
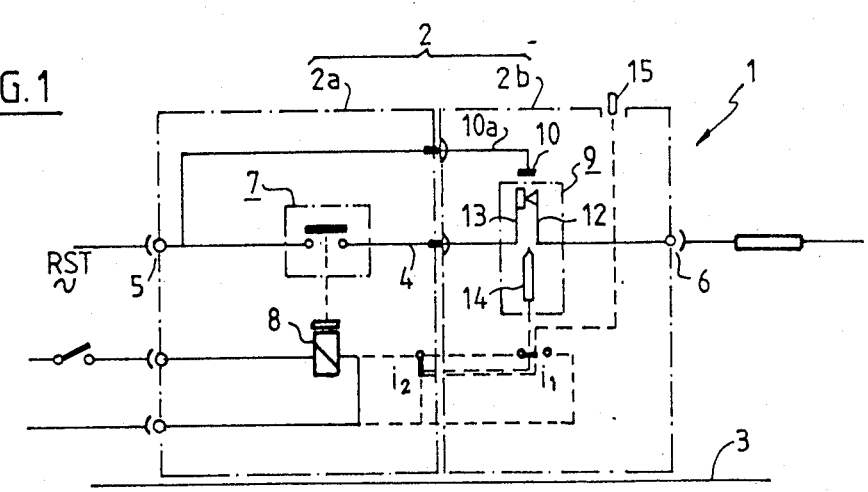
FIG. 1 shows schematically a device or apparatus according to the invention.

A protective switching apparatus or system 1 (shown in FIG. 1) comprises, in an insulating box 2 adapted for being fixed to a support 3, a plurality of internal circuits such as 4, which each end at two connection terminals such as 5 and 6 and comprise in series a contactor type switch device 7, which is adapted to be controlled by an electromagnet 8, and a protective switch device 9 of the current limiter type with automatic opening when abnormally high currents appear such as those appearing during short circuits. The device 9 comprises a transfer electrode 10 which is placed in the vicinity of the contacts of switch 9 and a shunt conductor $10_a$ which connects this electrode to the potential of terminal 5; this latter is connected for example to the supply mains RST, whereas the opposite terminal 6 is connected for example to a load 11. If the apparatus is intended to be installed in a multiphase mains, as many circuits 4 ... $10_a$ are provided as there are phases and a single electromagnet 8 provides simultaneously the control of the multiple switches 7.

An automatic opening switch may, for example, and preferably, open under the effect of high repulsion forces which develop between its fixed and mobile parts; in this case, magnetizable parts known per se, such as parallel branches of a U shaped circuit, may be associated therewith with the mobile contact supports for combining, with repulsion forces, those due to electromagnetic effects which act in the same direction of opening the mobile contact.

Figure 14:
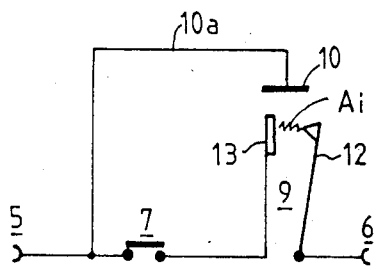
FIGS. 14 and 15 show schematically two possible states of the arcs appearing during opening of the protection switch.
Figure 15:
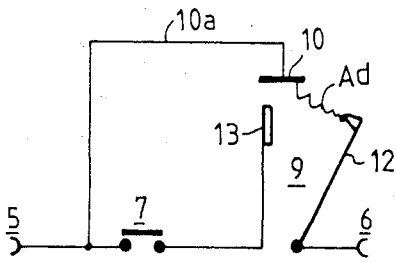

In the schematic arrangement shown, contacts 13 and 12 are respectively, one fixed, the other mobile and the transfer electrode 10 located close to these two contacts is placed so that an initial arc Ai, appearing between these contacts at the moment when they open, forms during movement of the mobile contact 12 a deformable ionized zone extending as far as this electrode 10 so that a branch arc Ad is formed between it and contact 12 and so that the initial arc is extinguished. The very high current which flowed or should have flowed at that time through switch 7 then flows through the shunt conductor $10_a$, see FIGS. 14 and 15.

Figure 2:
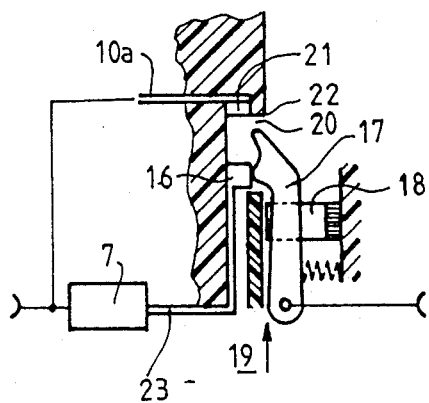
FIG. 2 shows in a simplified way an embodiment in which an isolating screen is used for transferring the initial arc.

In another embodiment which facilitates the transfer or transformation of the initial arc into a branch arc, see FIG. 2, between contacts 16, 17 of the second switch 18 and in the vicinity thereof is disposed an isolating screen 19 which is inserted therebetween at high speed on opening thereof; after a certain displacement, the screen conducts the initial arc Ai towards a zone 20 favorable for its transfer to the electrode 21 connected as before to the shunt conductor $10_a$; the initial arc will then be sheared by the screen (or respectively by an edge of an opening of the screen) against an insulating wall 22, after, because of the already ionized atmosphere, a branch arc Ad has been struck between the mobile contact 17 and the electrode 21; this latter arc is then extinguished, for example, because of lengthening due to the movement of the mobile contact or because of splitting up on metal fins which cool it. During the procedure, the screen provides preferably total isolation between contacts 16, 17 and 21, 17, for example through overlapping of isolating surfaces, the use of baffles of the box, etc. . .

Figure 3:
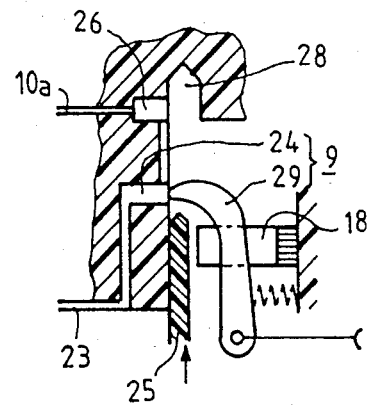
FIG. 3 shows another embodiment in which the fixed contact and the transfer electrode are substantially aligned in the direction of movement of the screen.
Figure 4:
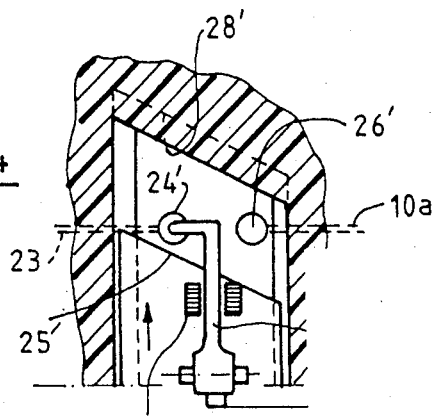
FIG. 4 shows in a simplified way an embodiment in which the fixed contact and the transfer electrode are placed laterally with respect to the direction of movement of the screen.

In another embodiment, shown in FIG. 3, and derived from the preceding one from which certain references of elements are borrowed, the same screen 25 provides successively the movement of the initial arc Ai struck between the fixed 24 and mobile 29 contacts, transfer thereof to the shunt electrode 26, the shearing of the initial arc against a first surface 27, and shearing of the derived arc Ad against a second isolating surface or groove 28 of the case, so as to protect the first switch and provide rapid protection of the line; contact 24 and electrode 26 may be aligned in the direction of movement of the screen, see FIG. 3, or placed transversely, the edge of the screen being for example slanted with respect to this direction, see FIG. 4.

In the general diagrams of apparatus shown in FIGS. 2 to 4, it has been assumed that an energy source, developed at the moment when a short circuit appears, rapidly propels the screen between the fixed and mobile contacts.

Figure 16:
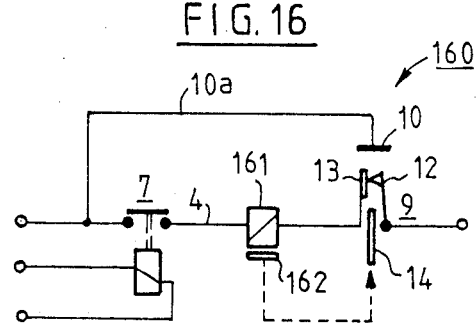
FIGS. 16 and 17 show schematically energy supply means adapted for providing rapid propulsion of the isolating screen.

In an embodiment 160, the principle of which is shown in FIG. 16, in which the elements having the same functions bear the same references, a coil 161 is placed in series in circuit 4; this coil very rapidly attracts a plate or a core 162 when very high currents appear and the movement thereof is communicated to screen 14 as soon as contacts 12 and 13 are open.

Figure 17:
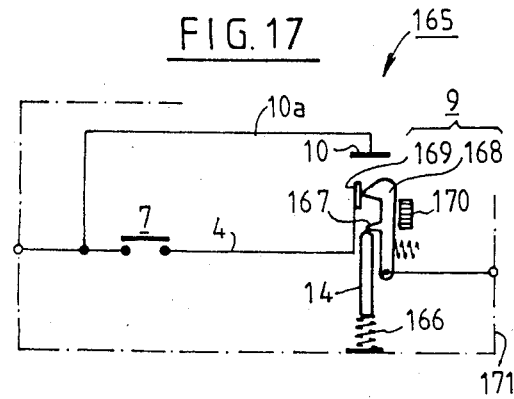

In another embodiment 165, the principle of which is shown in FIG. 17, a previously set spring 166 whose ends bear on case 171 and on screen 14, is released when a bolt or tooth 167 carried by the mobile contact 168 releases an edge of the screen allowing this latter to slide very rapidly between the contacts 168, 169; in this embodiment, magnetizable pieces such as 170 cooperate with a mobile contact for adding their effects to those of the repulsion forces for producing the initial separation.

Figure 5:
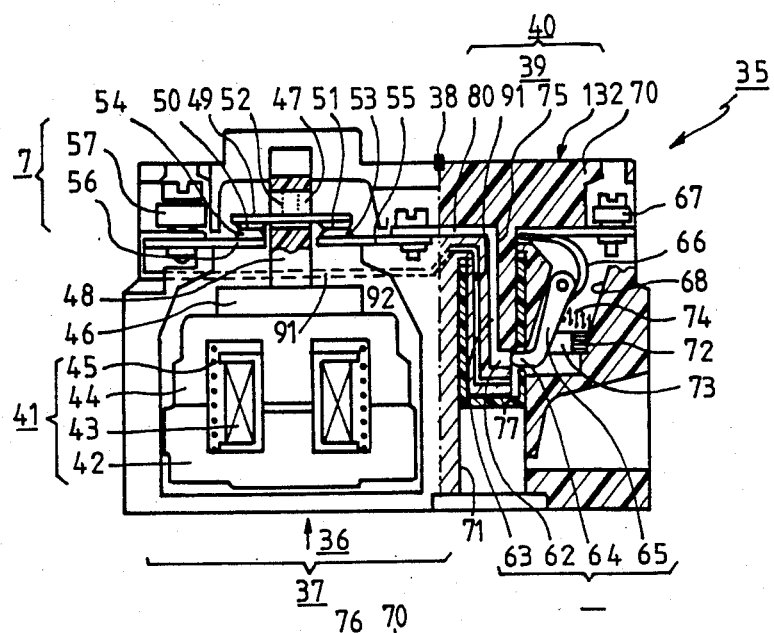
FIG. 5 illustrates an apparatus of the invention in a sectional view through plane PP' of FIG. 7.

A more detailed embodiment of a protective switching apparatus 35 of the invention is shown in FIG. 5 where, for example, in the same case 38, a contactor device 36 which is situated in the left hand region 37 of a body of this Figure, is associated with a protective limiting device 39 which is situated in an adjacent region 40. In this embodiment, the energy required for moving the screen, here tubular, is taken from that which is developed by the appearance of the initial arc Ai.

At 41 can be seen a control electromagnet comprising the fixed yoke 42, coil 43, the mobile armature 44 and its return spring 45; an insulating contact holder 46 which is integral with the armature, comprises in each of the windows such as 47 a multiplicity of parallel columns such as 48, a mobile contact bridge 49 equipped with contact inserts 50, 51 and its contact pressure spring 52. Two fixed contacts 54, 53 are carried by conducting supports 56, respectively 55, one of which comprises a connection terminal 57 accessible from the outside; this terminal corresponds to the one which is shown at 5 in FIG. 1, whereas the contact bridge and the fixed contacts correspond to the switch 7.

Figure 6:
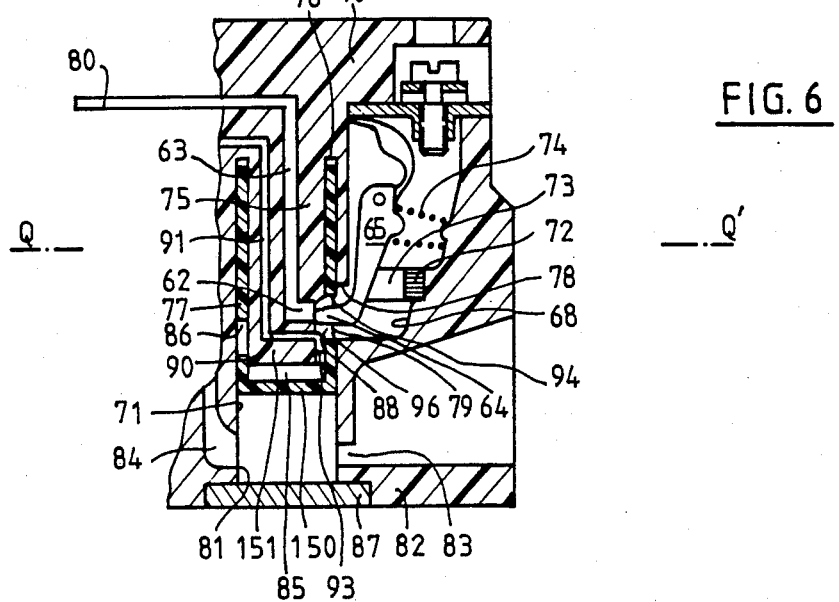
FIG. 6 shows on a larger scale a region of the switching apparatus of FIG. 5.

The protective limiting device 39 comprises, see FIG. 6, a switch 61 corresponding to the one bearing the reference 9 in FIG. 1, which comprises a fixed contact 62 carried by a conducting support piece 63 and a mobile contact 64 carried by a substantially parallel and conducting oscillating lever 65 connected by a flexible braided conductor 66 to a second terminal 67 of the apparatus which corresponds to the one shown at 6 in FIG. 1. Members 64, 65, 66 are situated in a cavity 68 of body 70 ending in a cylindrical housing 71; this cavity contains more particularly a U shaped magnetizable piece 72 whose parallel branches such as 73 surround the contact lever 65; this latter receives the resilient force of a contact pressure spring 74 for closing the switch in the rest position.

Figure 7:
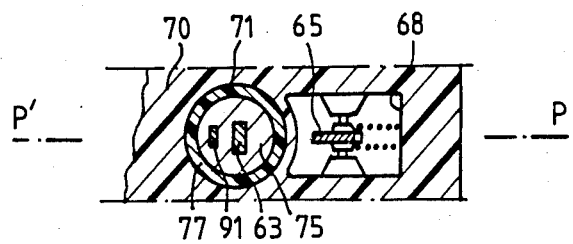
FIG. 7 shows a top view of the apparatus in section through plane QQ' of FIG. 6.

Along its path substantially parallel to the lever 65, the conducting support 63 is either applied against an insulating support 75 which is fixed, by means not shown, to a dividing wall or to the bottom 76 of the body 70 of the apparatus, or is contained inside this support. In both cases, this support fixed to the bottom 76 penetrates into housing 71. About this support, whose section may have a substantially circular shape, see FIG. 7, is disposed a case 77 made from an insulating material having preferably a cylindrical form of revolution which slides with slight play in a cylindrical housing 71; the bottom 150 of this case is placed in housing 71. The mobile contact 64 passes through an opening 78 common to the housing and to the cavity, and penetrates through an opening 79 in the case for coming to bear against the fixed contact. The end 80 of the conducting support 63, opposite the fixed contact, is connected to the fixed contact support 55 which may, for this purpose, be shaped like the opposite terminal 57 of switch 7.

The housing is connected to the atmosphere in its lower part 81 adjacent the base 82 through vents such as 83 and 84, see also FIG. 6. These vents serve, on the one hand, for removing the air which is present in this lower part, when the case moves downwards and further allow ionized gases which develop in a volume 85 existing between the case and support 75 during opening of the switch to escape to the atmosphere through openings 78, 79 and/or through another opening 86 in the case when the case comes into abutment against a dividing wall 87 of the box serving possibly as closure means for the housing.

The conducting transfer electrode 90, which extends first of all substantially parallel to the contact support 63, while being isolated from this latter and passing for example through support 75, then joins terminal 57 through the conductor 91, while passing for example through one of the isolating walls 92 which separate two adjacent switches such as 7.

This transfer electrode, see FIG. 6, has an internal free end 93 which is adjacent the two contacts 62, 64 and which ends in a volume 88 connected to the preceding one 85. Means, which retain the case in the rest position, illustrated in FIG. 5, may be in the form of springs, or lateral resilient flanges capable of moving away and retracting out of the housing. Moreover, orientation means, not shown, but the construction of which is evident, allow the case to keep the same angular orientation, so that resetting means, not shown, give it a new rest position identical to the preceding one after an opening operation.

The operation of this apparatus corresponds to those of the preceding apparatus, namely the appearance of a high overcurrent in the circuit placed between terminals 57, 67 causes first of all the limiting switch 61 to open when lever 65 is, on the one hand, pushed back by the electrodynamic forces developed between it and support 63 and, on the other hand, attracted towards the bottom of the magnetizable piece 72; the initial arc, which originates at that moment, causes an increase of pressure in the volumes 88, 85 so that the case moves very rapidly downwards in the Figure and the edge 94 of its opening 79 moves the arc and the ionized zone which surrounds it towards the transfer electrode 90, 93; when the resistance of this initial arc is greater than that of a transfer arc which may be established between electrode 93 and the mobile contact 64, this latter appears and the initial arc disappears, whereas the movement of the case causes shearing of the transferred arc at the moment when the edge of the opening overlaps with edge 96 the cavity which limits opening 79.

In a variant of this embodiment, which is shown in FIG. 8 and which relates to the limiting switch, this latter 100 comprises a contact lever 101, a mobile contact 102, a cavity 103 and an edge 104 identical to the preceding ones. The fixed contact 105 is here represented by a conducting piece, possibly tubular, placed at the external surface of a fixed isolating support 106 which has passing therethrough a substantially coaxial conductor 107 an extension 108 of which, surrounded laterally by an isolating jacket 117, extends axially beyond the position of this fixed contact. The tubular case 109 which may slide with appropriate reduced play about the support piece and inside housing 110, has on its lateral skirt 111 an opening 112 which is placed, in the rest position, opposite the fixed contact for letting the mobile contact 102 pass.

This case has on its front wall 113 a second opening 114 which surrounds the isolated portion 108 in the rest position. A non isolated end 116 of extension 108, which represents the transfer electrode, is therefore isolated by a zig zag path of the fixed and mobile contacts for the rest position of the case, shown in this Figure. When, after opening of the limiting switch, the case moves as before in direction F, the skirt portion 111 placed above the opening overlaps the fixed contact, whereas the extension is simultaneously uncovered.

The initial arc between contacts 105, 102 is therefore progressively moved towards the transfer electrode 116, until the moment when an ionized gas zone bathes simultaneously this electrode and the mobile contact, and when a transfer arc is established therebetween. This initial arc is in its turn sheared by covering of opening 112 and of the wall or edge 104 which limits cavity 110.

In another embodiment 120 of this variant, shown in FIG. 9, where the comparable elements have references of the same rank accompanied by a letter -a-, the extension $108_a$ of the transfer electrode $116_a$ is not isolated by an isolating jacket integral with the isolating piece $106_a$, but by a tubular jacket 121 which is carried by the internal face 122 of the bottom $113_a$ of case $109_a$ and which penetrates into a recess 123 in this isolating piece $106_a$ while establishing isolating baffles in the rest position shown; in this embodiment, in which the transfer path is shorter than before, the operation is identical to the one which has been described.

If need be, the transfer arc Ad may be stretched by a particular conformation shown in FIG. 10, in which the case has already moved, and in which the jacket 125 extends further inside a recess 126 of piece $106_b$. This case here comprises a side opening 127 which allows the transfer arc Ad to form, but whose edge 128 forces this arc to stretch during movement in direction F of case $109_b$.

Although the opening of the limiting switch 39 has interrupted the supply to the load, confirmation of such opening of the circuit by opening of the contactor 36 placed in series may be desired; in this case, a switch 139, whose opening will be caused for example by movement of the case, see FIG. 11, may be placed in series in the supply circuit for the coil 43 of electromagnet 41. Arrangements must be made so that this switch is only open when the initial arc Ai is extinguished.

Figure 13:
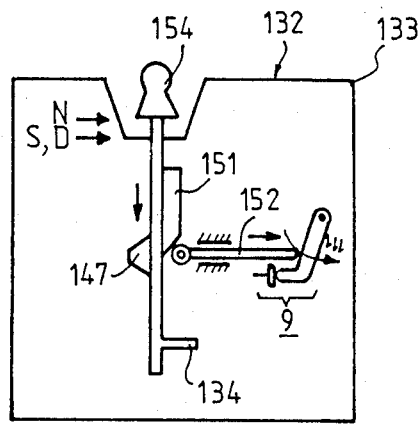
FIG. 13 shows in a simplified way members associated in a complementary manner so that the preceding apparatus may have an additional isolating switch function.

If need be, a slider 154 may also be used either for preventing operation of the contactor, or, with the inclusion of a cam device 151 and a rocker shaft 152, see FIG. 13, for causing manual opening of the mobile contact of the limiter switch 9 for the purpose of isolating the line in a stable "isolated" position S.

Resetting of the cases, that is to say the operation by which they are repositioned in the rest position R, after automatic opening which has brought them to the working position T, may be provided by means of a manually controlled slider 130, see FIG. 11, whose handle 131 is placed on the front face 132 of the apparatus 133, see also FIG. 12; a hook 134 placed at the end of a rod 135 integral with this handle, and situated opposite the front face 136 of the case 137 in the bottom of a housing 138 having a depth allowing additional travel of this case, allows a movement to be communicated thereto going from position T to position R, after operation caused by an overcurrent. The operation of a confirmation swtich 139 mentioned above may be provided by means of this slider not only in the opening direction, but also in the closing direction thereof, by means of a cam or ramp 147 integral with rod 135; in this case, the slider must be able to assume three positions, one a stable "normal" position N, in which the conformation switch 139 is closed, the other "trip" D also stable position, close to or merging with position S, in which this slider has been driven in a little more by the cases 137 striking against hook 134 and in which the switch 139 is open and the third "reset position" RE, preferably unstable, in which the slider 130 replaces the cases in position R before taking up again the position N if need be by means of a resilient return means. The position of the handle on the front face, which subsequently allows the user to be informed of the appearance of a current defect, is advantageously arranged so that the cases may move in directions substantially perpendicular to this front face 132 and parallel to those of the movements of the armature of the electromagnet; this orientation contributes in fact to a rational use and combination of the volumes of the contactor and of the limiter in which the connection terminals 57, 67W going to the mains and to the load are placed at two opposite ends of the apparatus.

In a particular embodiment 150 of the apparatus shown in FIG. 12, the contactor 36 and the limiter 39 may be disposed in particular boxes 140 respectively 141 which may be mechanically associated. The terminals 55 and 80 which are respectively carried by these boxes, as well as transfer terminals 142 and removable conductors such as 143, allowing the circuit $10_a$ of FIG. 1 or 91 of FIG. 5 to be formed parallel to a straight line Δ passing through two opposite terminals, will be advantageously disposed in the vicinity of the front faces 144, 145 in channels 149, recesses or isolated chambers 146, 147 set back with respect to these faces for receiving terminals 80.

As has been shown schematically in FIG. 1, the opening confirmation switch $i_1$ or $i_2$, (which is equivalent to the one shown at 139 in FIG. 11) may be placed either close to switch 9 for shortening the transmission means which control it, or close to the electromagnet 8 for shortening the power supply circuit for the coil and avoiding the presence of local connection terminals when the apparatus is formed by the assembly of two boxes.

What is claimed is:

1. A protective switching apparatus comprising:

a first connection terminal adapted to be connected to a current line of an electrical network, so as to have an electrical potential;

a second connection terminal adapted to be connected to a load which is conceived so as to be traversed by a nominal current;

a first switch which is controlled by an electromagnet and which is adapted for establishing and interrupting frequently said nominal current, said first switch comprising a first input power terminal connected to said first connection terminal, and an output power terminal;

a second switch with automatic opening having properties for limiting fault currents, so as to provide protection of said line and to prevent dammage of the first switch, said second switch having a second input power terminal connected to said first output terminal, a second output power terminal connected to said second connection terminal, first and second contacts respectively connected to said second input power terminal and to said second output power terminal and means acting on at least one of said contacts when a fault current is occuring, for causing the second switch to pass from a closed position to an open position wherein a first arc path having a first resistance is formed between said first and second contacts;

a transfer electrode located in the vicinity of said first and second contacts and isolated therefrom, said transfer electrode being connected to said first connection terminal by a conductor placed in parallel across the first switch;

and a first mobile isolating piece adapted to be propelled between said first and second contacts during said automatic opening, so as to form with said transfer electrode and said second contact a second arc path having a second resistance less than the said first resistance.

2. The apparatus as claimed in claim 1, wherein said first isolating piece is formed by a case provided with a bottom, said case being slidingly mounted in a determined direction along a second isolating piece having an end portion on which the said first contact and the said transfer electrode are fixed, said second contact being mobile and passing through a side opening which is provided in the case close to said bottom and which is moved towards the transfer electrode during said automatic opening.

3. The apparatus according to claim 2, wherein said second switch is housed in an isolating box which comprises a recess in which said case is slidably mounted, the said recess communicates with a cavity occupied by said second contact through an aperture and the said side opening moves opposite said recess.

4. The apparatus according to claim 3, wherein said cavity contains a magnetizable piece which attracts said second contact against the action of a pressure spring when an overcurrent flows.

5. The apparatus as claimed in claim 2, wherein said second switch is housed in an insulating box having a front face provided with at least one of said connection terminals, and the said determined direction of the case is perpendicular to the front face.

6. The apparatus as claimed in claim 2, wherein said second contact is carried by an oscillating lever which is connected to said second connection terminal, the said second connection terminal being placed in the immediate vicinity of the said lever.

7. The apparatus as claimed in claim 1, wherein said first and second switches are housed in two respective boxes, and a conductor extending parallel to a straight line Δ passing through said first and second connection terminals, connects the transfer electrode to the said first terminal, while passing through isolated regions of the box containing the first switch.

8. The apparatus as claimed in claim 1, wherein said second switch is housed in a box, and detection means which detect the opening of this second switch act on a mobile member having one end portion which extends through an aperture provided on a face of the said box.

9. The apparatus as claimed in claim 8, wherein said mobile member is integral with a transmission means which causes opening of a contact placed in series with a control coil of the said electromagnet.

10. The apparatus as claimed in claim 9, wherein the said detection means and the said transmission means form a part of a slider whose operation places the said case in a rest position.

11. The apparatus as claimed in claim 1, wherein said first and second switches are contained in two respective boxes able to be removably associated.

12. The apparatus as claimed in claim 1, wherein the said isolating piece is formed by a flat screen which is moved as soon as the contacts of the second switch open, by the release of an accumulating device.

13. The apparatus as claimed in claim 1, wherein the said isolating piece is formed by a flat screen which is moved as soon as the contacts of the second switch open, by the energization of a high speed relay placed in series with said first and second switches.

* * * * *